United States Patent

[11] 3,628,526

[72] Inventor Robert P. Bigliano
 Wilmington, Del.
[21] Appl. No. 815,731
[22] Filed Apr. 14, 1969
[45] Patented Dec. 21, 1971
[73] Assignee E. I. du Pont de Nemours and Company
 Wilmington, Del.

[54] PHYSIOLOGIC FLUID PRESSURE SENSOR HEAD
 12 Claims, 10 Drawing Figs.
[52] U.S. Cl.................................................. 128/2.05 E,
 73/80, 128/2 R, 128/2.05 N
[51] Int. Cl................................................... A61b 5/02
[50] Field of Search........................................ 128/2, 2.05
 E, 205 N, 205 R; 73/80

[56] References Cited
UNITED STATES PATENTS
3,099,262 7/1963 Bigliano ..................... 128/205 E
3,150,521 9/1964 Mackey et al. ............... 73/80

OTHER REFERENCES
Block Engineering Inc., " Model 10 Durham Tonometer" 2 pp., Feb 10, 1966.

Primary Examiner—William E. Kamm
Attorney—Herbert M. Wolfson

ABSTRACT: A pressure sensing head for measuring physiologic fluid pressure through an elastic body membrane, which is composed of: a membrane depressor-element with a membrane-depressing face adapted to engage the surface of the membrane; a supporting structure containing a pressure-development cavity, a port for introducing gas under pressure into the pressure-development cavity and a port for measuring the gas pressure developed within the pressure-development cavity; and a feedback chamber formed in the supporting structure and adapted in a manner such that the depressor-element is free to move relative to the supporting structure to vary the free volume of the feedback chamber. The feedback chamber is either an integral part of or connected to the pressure-development cavity and is connected through a passage in the depressor element to the membrane-depressing face of the depressor element. The membrane-depressing face is adapted so that the gas introduced into the pressure-development cavity will be discharged into the atmosphere in a manner such that the discharging gas is throttled by the disposition of the membrane relative to the membrane-depressing face.

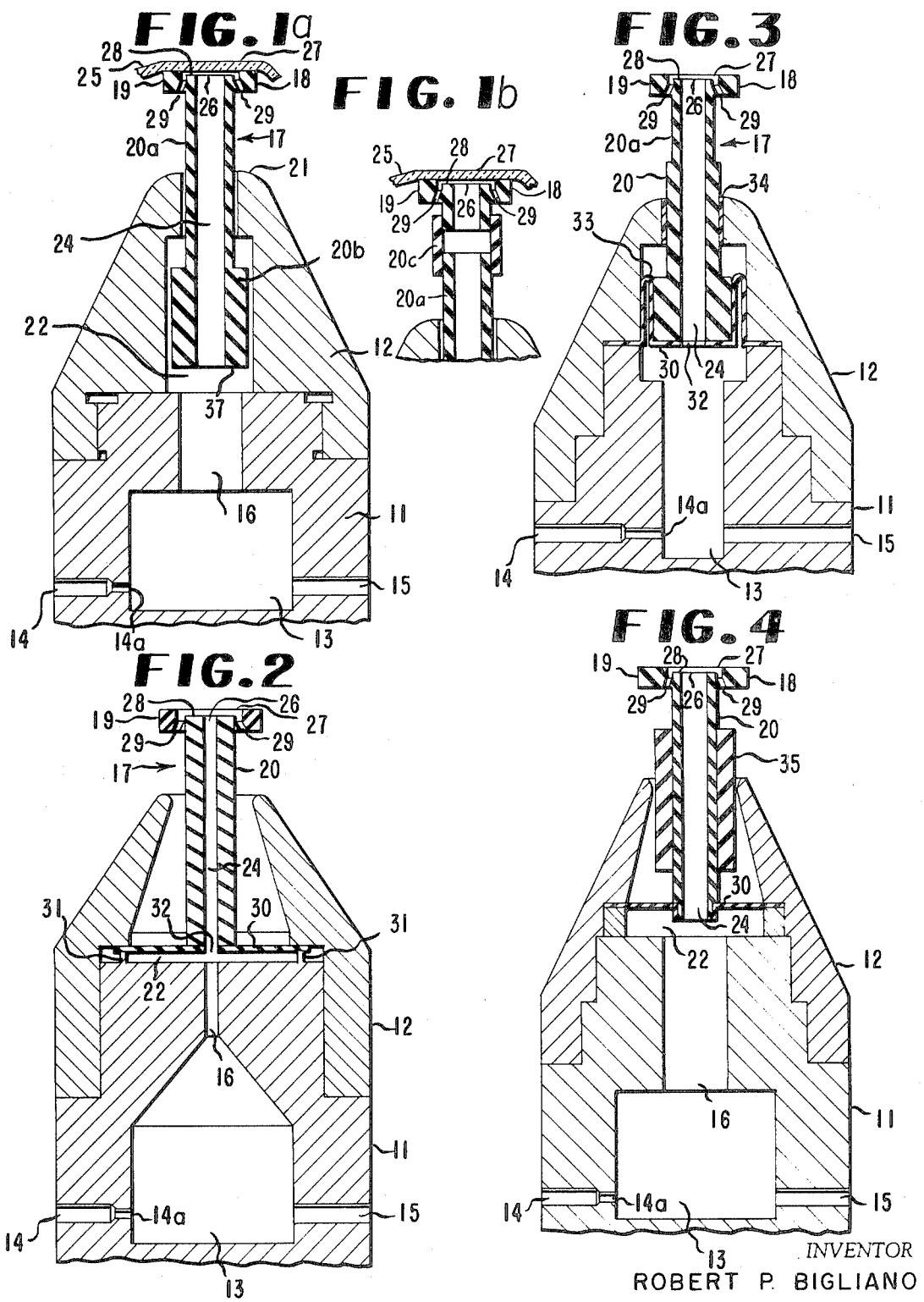

INVENTOR
ROBERT P. BIGLIANO 3,628,526

PHYSIOLOGIC FLUID PRESSURE SENSOR HEAD

BACKGROUND OF THE INVENTION

This invention relates to an improved device for rapidly and accurately measuring physiologic fluid pressure. More particularly it relates to an improved head for a pressure sensing device adapted to measure the pressure of body fluids, such as blood pressure, interocular pressure and the like, through the walls of an elastic body membrane. Still more particularly it relates to an improved head for a pneumatic aplanation-type pressure sensing device, such as that described in U.S. Pat. No. 3,099,262. The present invention is particularly suited for use as a tonometer head in the measurement of interocular pressure but its use is not limited to that use.

Aplanation-type pressure sensing devices operate by first flattening a given area a on the surface of the membrane encasing the fluid, and then exerting a gentle but steadily increasing force, over that area, until the external applied pressure overcomes the internal supporting pressure of the fluid, at which point a pressure discontinuity occurs. By first flattening a given area of the membrane, supporting effects due to the stiffness of neighboring body tissue is minimized so that the measured external pressure is related to only the internal fluid pressure and to the stiffness of the body tissue directly within the area of contact. Various methods have been devised to compensate for this remaining membrane stiffness. Most are based on the fact that the area of contact and, therefore, the amount of membrane involved is a constant. One particularly useful device for achieving this compensation is the pneumatic pressure sensing head described in U.S. Pat. No. 3,099,262, where the measured pressure is related to the actual pressure by a constant of proportionality which is a function only of the dimensions of the pressure sensing head. This instrument functions quite well, but there are some inherent problems in its use which have heretofor limited its accuracy.

It is characteristic of this type of pressure sensing device that it is manually held. Since the forces involved are of such small magnitude, and since hand movements are of such a gross nature, reproducible flattening and hence the pressure discontinuity end point have been difficult to achieve. Another problem is found in the fact that different membranes in different people have different surface characteristics, so that a different pressure must be exerted to flatten a given area of the membrane.

These difficulties have been generally recognized and several methods have been used to correct them. The simplest and most obvious is to repeat the measurement several times to average out the effect of any unsteadiness in the hand of the user as well as variations in the character of the surface of the different membranes. A more sophisticated method is discussed in U.S. Pat. No. 3,299,882 where a gimbled self-conforming mount is used to accommodate the pressure sensing device to the body site. Both of these solutions have obvious defects in terms of the amount of time required to make the measurement, the amount of operator discretion involved and the sheer clumsiness of the instrument.

Accordingly, it is an object of this invention to provide an improved pressure sensing device wherein the pressure sensing element thereof, once set upon the membrane, automatically seeks a predetermined area of contact independent of the operator and maintains this stable position while the measurement is being made.

Another object of the present invention is the provision of a novel mount for the pressure sensing element such that once the element is in stable contact with the membrane the motion of the pressure sensing element is independent of gross movements of the mount.

A still further object of this invention is the provision of a novel aplanation pressure sensing device wherein the area of flattening achieved thereby remains constant and independent of structural differences in different parts of the membrane or in the membranes of different subjects.

SUMMARY OF THE INVENTION

Accordingly these objects are achieved by providing, in a pneumatic aplanation pressure sensing device, a pressure-sensor mounting means capable of providing a feedback force for urging the pressure sensing face into firm contact with the surface of the membrane, with continually increasing force applied independent of the operator, until the force, due to the internal pressure of the fluid acting over the contact area, is balanced by the feedback force, and an equilibrium condition is established such that the pressure acting on the sensor corresponds to the internal fluid pressure.

Generally, the pressure sensing device comprising: a membrane-depressor element with a membrane-depressing face adapted to engage the surface of the membrane; a supporting structure containing a pressure-development cavity, a port for introducing gas under pressure into the pressure-development cavity and a port for measuring the gas pressure developed within the pressure-development cavity; and a feedback chamber formed in the supporting structure in a manner such that the depressor-element is free to move relative to the supporting structure to vary the free volume of the feedback chamber. The feedback chamber is either an integral part of or connected to the pressure-development cavity and is connected through a passage in the depressor-element to the membrane-depressing face of the depressor-element. The membrane-depressing face is adapted so that the gas introduced into the pressure-development cavity will be discharge into the atmosphere in a manner such that the discharging gas is throttled by the disposition of the membrane relative to the membrane-depressing face. In one embodiment the feedback chamber is in the form of a cylinder and the depressor-element is in the form of a piston, free to move within the cylinder without becoming disengaged from it. In another embodiment the depressor element is attached to a flexible diaphragm which is itself attached to an annular flange extending above the supporting structure so that the feedback chamber is formed between the diaphragm and upper surface of the supporting structure. In one embodiment the depressor element is restrained from moving in a direction other than in a direction perpendicular to the membrane-depressing face. In another embodiment the depressor element is made from a flexible material so that the membrane-depressing face can move in any direction. In a preferred embodiment the membrane-depressing face has an annular depression in its surface concentric with the opening connected to the feedback chamber and separated from the opening by a ridge with a surface recessed from the membrane-depressing face. The annular depression is connected to the rear of the depressor element by air-escape ports so that gas entering the pressure-development cavity will pass through the opening in the center of the membrane-depressing face and exhaust into the atmosphere through the annular depression and the air-escape ports without completely disrupting contact between the membrane and the membrane-depressing face.

The advantages and operation of the present invention can best be understood by reference to the following figures:

FIG. 1a is a side elevation cross-sectional view of a preferred embodiment of the pressure sensing head of the present invention;

FIG. 1b is a side elevation cross-sectional view of a portion of the pressure sensing head illustrated in FIG. 1a, showing a modification of the support structure for the membrane-depressing face.

FIG. 2 is a side elevation cross-sectional view of another preferred embodiment of the pressure sensing head of the present invention;

FIG. 3 is a side elevation cross-sectional view of a third preferred embodiment of the pressure sensing head of the present invention;

FIG. 4 is a side elevation cross-sectional view of a fourth preferred embodiment of the pressure sensing head of the present invention;

Figure 6A:
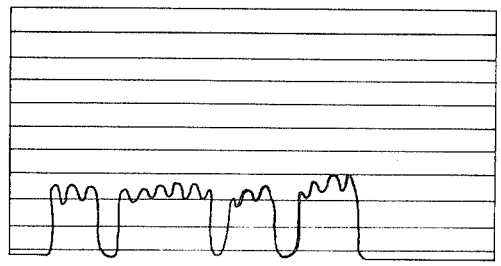
Figure 6B:
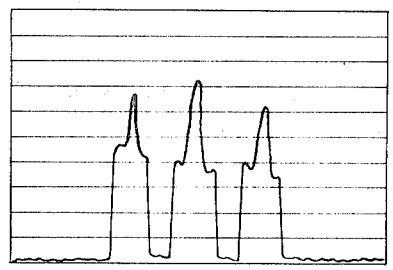

FIGS. 6a and 6b provide a comparison between measurements made with an instrument incorporating the present invention to measurements made with a conventional instrument.

DETAILED DESCRIPTION OF THE DIAGRAMS

In FIG. 1a the supporting structure is divided into two parts, a first body part 11 and a second body part 12. The first body part 11 is provided with a gas pressure-development cavity 13, a first port 14 for introducing gas under pressure into the pressure-development cavity at a substantially constant rate of flow, and a second port 15 for measuring the pressure developed within the pressure-development cavity. As discussed in the prior art, specifically U.S. Pat. No. 3,099,262, the gas supply port 14 is provided with a restriction 14a for preserving the fixed flow rate of gas delivered to the cavity. Port 14 is externally connected to some source of fluid supply, typically a gas at 30 p.s.i.g. As illustrated in FIG. 1, the gas pressure-development cavity 13 is in the form of a chamber formed within the first body part and connected to the upper surface of the first body part by a passage 16. As can be seen from FIG. 2, however, the pressure-development cavity 13 can be in the form of a cavity, recessed in the upper surface of the first body part rather than a completely enclosed chamber connected by a passage to the upper surface. The shape or location of the cavity are not critical and will be determined by the needs of the instrument and by manufacturing considerations. Any convenient pressure measuring device can be connected to pressure measurement port 15. The only criterion for the measuring device is that it must be sensitive enough to detect the small pressure variations that occur in the cavity.

The first and second body parts of the supporting structure can be made from any rigid, easily formed, material, like a metal or a plastic. Typically stainless steel or Lucite acrylic resin can be used. The first body part 11 is adapted to be attached to the second body part 12 in some substantially leaktight arrangement. One simple way to achieve this is to threadedly join the two parts. In the configuration illustrated in FIGS. 1 through 4 this would be accomplished by threading the first body part 11 and internally tapping the second body part 12 so as to be threadedly joined to the first body part.

The second body part 12 is in the form of the frustum of a hollow cone. The narrowest portion of this frustum is adapted to engage the membrane-depressor element 17 in a substantially friction free arrangement. As illustrated in FIG. 1 the membrane-depressor element consists of a disc 18, with a membrane-depressing face 19, and a cylindrical support tube 20 to which the disc is attached. The support tube, in this particular instance, consists of two cylindrical parts, a top part 20a attached to the disc, and a bottom part 20b attached to the top part. The second body part 12 has a channel 21 formed in it so that the support tube of the membrane-depressor element fits into the second body part like a piston in a cylinder. The second body part is hollowed out into a chamber, called the feedback chamber 22, which is connected to the pressure-development cavity 13 by passage 16. As illustrated, the bottom part 20b of the support tube has a larger diameter than the upper part 20a, and also a larger diameter than channel 21 and passage 16, so that while the membrane-depressor element is free to move relative to the supporting structure it is restricted in its movement by the fact that the bottom part of the support tube 20b is constrained within the feedback chamber. The supporting structure and the membrane-depressor element are disposed so that the former engages the latter in a substantially leaktight and substantially friction free arrangement. This can be accomplished by providing a narrow clearance between the two parts, as illustrated, by using a Teflon fluorocarbon gasket, or by using any conventional substantially friction-free sealing means known to those skilled in the art. The only criterion involved in the design is that the membrane-depressor element is constrained to move relative to the supporting structure in a direction perpendicular to the plane of the membrane-depressing face 19, without becoming disengaged from the supporting structure and in a manner such that motion of the membrane-depressor element will vary the free volume in the feedback chamber 22.

As a modification to a structure shown in FIG. 1a, FIG. 1b shows the rigid support tube 20a connected to disc 18 by a flexible sleeve 20c. The flexible sleeve allows motion of the membrane-depressing face in directions other than perpendicular to the plane of the face while the rigid support tube 20a still substantially restricts motion of the membrane-depressor element to motion in a direction perpendicular to the plane of the membrane-depressing face.

The structure is designed so that gas introduced into the pressure-development cavity 13 will pass through the feedback chamber 22 into the internal passage 24 in the membrane-depressor element 17, from which it will be discharged into the atmosphere.

The design of the membrane-depressing face is an important aspect of this instrument. The design is according to the teaching of U.S. Pat. No. 3,099,262 and as such is not part of the present invention, but rather an essential feature in the design of any pneumatic aplanatic pressure sensing device. The membrane depressing face is adapted to engage and flatten the surface of a membrane 25 into conformity with the surface of the membrane-depressing face. The membrane-depressing face is further adapted so that gas discharging form the pressure-development cavity passes through an opening 26 in its surface and is exhausted into the atmosphere without completely disrupting contact between the membrane and the surface of the membrane-depressing face. The membrane-depressing face is still further adapted so that the discharging gas is throttled by the disposition of membrane 25 relative to the opening 26 in the membrane-depressing face. As illustrated in FIGS. 1 through 4, this can be accomplished by providing the membrane-depressing face with an annular depression 27 circumscribing opening 26 and separated from it by a ridge 28. The annular depression is then connected to the rear surface of the disc 18, by a series of air-escape ports 29. The surface of ridge 28 separating the annular depression 27 from opening 26 is recessed from the surface of the membrane-depressing face by a predetermined distance. In accordance with the teaching of U.S. Pat. No. 3,099,262 the ridge is recessed by about 0.0010 inch. Gas discharging from the passage 24 in the membrane-depressor element must, therefore, pass through the space between the membrane 25 and the surface of the ridge 28, before being exhausted to the atmosphere, and is throttled by the separation between them. Also following the teaching of U.S. Pat. No. 3,099,262, the membrane-depressing face can be covered by a thin membrane (not shown) which for sanitary purposes separates the body membrane from the surface of the membrane-depressing face without affecting the measurement. The membrane-depressor element need not be made in one piece or from one material. In fact, as shown, to position the parts the membrane-depressor element must be made in several parts which are attached after the support tube has been inserted through the opening 21. The parts can be made from any relatively rigid material such as Delrin acetal resin.

Before discussing the operation of this instrument, the other embodiments depicted in FIGS. 2 through 4 will be discussed, since the operation of all four embodiments is similar. In FIG. 2 the membrane-depressor element 17 no longer acts as a piston in the feedback chamber 22. Instead a flexible diaphragm 30, supported on an annular flange 31 extending above the first body part 11, is provided. The region between the diaphragm 30 and the upper surface of the first body part 11 is the feedback chamber. The diaphragm 30 has an opening 32 in its center and the membrane-depressor element is attached to the diaphragm so that the internal passage 24 in the support tube is connected to the opening 32 in the diaphragm. The gas introduced into the pressure-development cavity still passes through the feedback chamber and is discharged into the atmosphere through the membrane-depressor element. Since the diaphragm is flexible and since the second body part 12 of the supporting structure is not adapted to engage the support tube 17 in a manner such as to restrain its movement, the membrane-depressor element is not constrained to move in a direction perpendicular to the plane of the membrane-depressing face. The membrane-depressor element can move in a direction perpendicular to the plane of this face, however, and if it does, then its movement will vary the free volume in the feedback channel. It must be noted, however, that the membrane-depressor element can also be moved by deforming the diaphragm without changing the free volume in the feedback chamber. The nonvolume changing motion does not affect the feedback action discussed below but will aid in aligning the membrane-depressing face with the surface of the membrane. In the normal situation, both volume changing and nonvolume changing motion of the membrane-depressor element will occur and both feedback and alignment action will be present.

The diaphragm can be made from any flexible material such as a thin metal sheet or an elastomeric material. One such material is Silastic silicon rubber. If the support tube is also made from a flexible material such as Silastic silicon rubber it will have a degree of flexibility which adds to the alignment action discussed above. The disc 18, however, should still be made from a rigid material.

In FIG. 3 the diaphragm 30 has an annular deformation 33 circumscribing the opening 32 in its center. The deformation has an outer diameter less than the diameter of the feedback chamber 22 and an inner diameter greater than the external diameter of the support tube 20 at the point where it joins to the depression. The deformation is positioned so as to increase the area of the feedback chamber; which is not absolutely necessary. This bellowed diaphragm can be made from any flexible material such as a metal or an elastomer.

As illustrated the feedback chamber 22 and the pressure-development cavity 13 are one and the same. The second body part 12 of the supporting structure is once again adapted to engage the membrane-depressor element in a substantially friction free arrangement so that it is free to move only in a direction perpendicular to the plane of the membrane-depressing face. This is accomplished, as illustrated, by using a Teflon fluorocarbon gasket 34. In this case the support tube 20 would be made from a rigid material instead of a flexible material as in the case of the support tube in FIG. 2, although there is no reason why the portion of the support tube 20a nearest to the disc 18 could not be made from a flexible material to preserve the alignment action.

FIG. 4 illustrates an embodiment of the invention which is similar to that shown in FIG. 3 except that the feedback chamber 22 and the pressure development cavity 13 are no longer integral. The membrane-depressor element is once again constrained in its movement, this time by providing the support tube 20 with a sleeve which, as illustrated, allows only a slight clearance between the membrane-depressor element and the supporting structure. Alternatively, the sleeve can be made from a material such as Teflon fluorocarbon adapted to contact the supporting structure in a substantially friction free arrangement.

As discussed above the novel feature of the present invention is to be found in the fact that once the membrane-depressing face has been applied to the membrane it automatically seeks a precise, reproducible position relative to the membrane, eliminating the need for successive applications of the instrument to the membrane to average out placement errors. This self-correcting action is manifest in a tendency of the membrane-depressing face to move towards the surface of the membrane once initial contact is made, and to resist any attempt to be withdrawn. Pneumatically, there are several possible explanations for this attractive force. At the present time, however, it is believed that the proper explanation is that the feedback chamber provides a feedback action not present in prior art devices. And that this feedback action action supplies the force for the self-correcting action. In what follows the discussion will be limited to a discussion of a tonometer which is an instrument designed to measure interocular pressure through the cornea, since such instruments are particularly prone to the problems discussed above. It is to be understood, however, that this is for convenience and is not meant to limit the use of this invention.

Figure 5A:
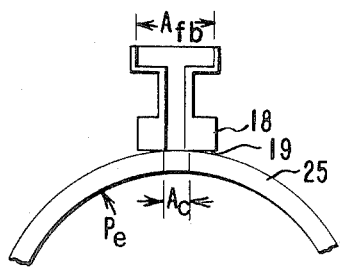
FIG. 5a, 5b and 5c illustrate how the pressure sensing head of the present invention engages the membrane surface and is brought in successive stages into stable and fixed area contact with the membrane.
Figure 5B:
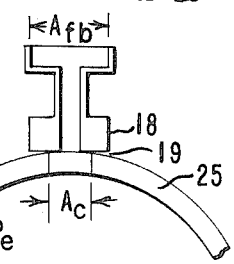
Figure 5C:
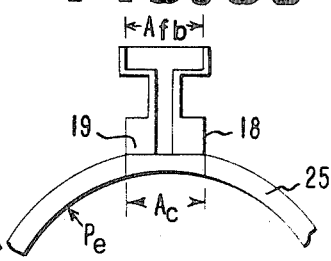

Tonometers are usually manually applied to the eye, and, therefore, some compensation for gross movement of the operator's hand is necessary. In the present invention, for any gross motion of the operator's hand there is a small compensating motion of the membrane-depressor element which causes the membrane-depressing face to sense a constant ocular area at all times after the equilibrium position has been established. The operation of this feedback action can be seen by reference to FIG. 5. When the membrane-depressing face 19 just touches the surface of the eye 25, as shown in FIG. 5a, the area of contact with the eye $A_c$ is very small. The measured pressure $P_t$ is also small, but this pressure is exerted on the area of the movable portion of the feedback chamber $A_{fb}$, and generates a force $P_t A_{fb}$ in the direction of the eye. In the case of FIGS. 2 through 4, this area is the area of the diaphragm 30. In the case of FIG. 1 it is the area of the lower surface of the support tube 37. The only restraining force (neglecting scleral stiffness) is the interocular pressure $P_e$ exerted on the small area of contact $A_c$. Thus, there is a net force causing the membrane-depressor element to be moved towards the eye, increasing the area of contact $A_c$ with the eye as shown in FIG. 5b. The measured pressure $P_t$ increases and the force produced by the feedback action also increases. At the same time the restraining force exerted by the eye increases, since the area of contact has also increased. The net force continues to move the membrane-depressing face towards the eye until an equilibrium position is reached. If there were no stiffness effects (due to the sclera) this equilibrium would occur at the point where $$P_e A_c = P_t A_{fb}.$$

As discussed in U.S. Pat. No. 3,099,262 the measured pressure is related to the interocular pressure by the relationship $$P_t = K P_e,$$

where K is a constant related to the distance that the surface of the ridge 28 is recessed from the surface of the membrane-depressing face. Therefore $$P_e A_c = K P_e A_{fb}$$

and $$A_c = K A_{fb}.$$

For a given head design, therefore, $A_c$ will be a fixed area of contact, attainable without regard to any unsteadiness in the hand of the user, or geometric differences in the eye of the subject. If an attempt is made to remove the instrument from the eye, the area of contact $A_c$ decreases, which causes an increase in the net force towards the eye, and the membrane-depressor element moves towards the eye. This is manifest in the observed tendency of the instrument to "stick" on the eye.

Preferably the area of the membrane-depressing face should be equal to or larger than the value of $K A_{fb}$, otherwise the depressor-element will continue to move towards the eye even after the membrane-depressing face is fully seated on the eye. The invention is operable because an equilibrium position will occur due to the force exerted by the over depressed sclera, but it is preferable and less painful to the patient if no over depression occurs. The value of K depends on the nozzle parameters and can be less than, equal to or greater than one. Again it is preferable if K is equal to or greater than one since the relationship between $P_e$ and $P_t$ will then be more nearly linear, but K can be less than one without affecting any aspect of this invention. If K is greater than one, then the area of the membrane-depressing face in contact with the surface of the eye must be greater than the area of the diaphragm.

The implications of this feedback action can be seen with reference to FIG. 6, which compares the response of two tonometers. FIG. 6a shows the response of a tonometer employing the present pressure sensing head. FIG. 6b shows the response of a standard Durham tonometer. Both tonometers are designed according to the teaching of U.S. Pat. No. 3,099,262 and as such their sensitivity will depend upon the dimensions of the membrane-depressing faces, but it is clear from a comparison of the two figures that there is a difference in the accuracy of the two instruments. In FIG. 6a four applications of the pressure head of the present invention were made to the eye and it can be seen that the initial inflection points for each reading are all within 2 mm. Hg. of one another. There is then effectively only one inflection point in each measurement. In FIG. 6b three applications of the Durham tonometer were made to the eye. The two inflections at the right are within 2 mm. Hg of one another, but the one at the left is falsely high. Since the two at the right agree they are taken to be the valid reading, but as can be seen some discretion is needed in determining which readings are the correct readings, and this leads to an error not present when the present invention is used.

From the foregoing discussion, it will be apparent that the apparatus of this invention can be modified in numerous respects and that the foregoing discussion is not meant to limit the scope and/or use of the present invention.

What is claimed is:

1. In a pressure sensing head for measuring fluid pressure through a membrane including: a supporting structure containing a pressure-development cavity; means for introducing gas at a substantially fixed rate of flow into said cavity; means for measuring the gas pressure in said cavity; and a membrane-depressor element supported by said supporting structure, said membrane-depressor element having a membrane-depressing face with a flow throttling opening in its surface and a passage connecting said flow throttling opening with said cavity; the improvement comprising a variable volume feedback chamber within said supporting structure formed by said membrane-depressor element and said pressure-development cavity, said membrane-depressor element being movably supported by said supporting structure so that the volume of said feedback cavity is varied by the motion of said membrane-depressor element substantially perpendicular to the surface of said membrane.

2. The pressure sensing head of claim 1 wherein said supporting structure comprises a projection coacting with the sides of said membrane-depressor element to restrict its motion to motion in a direction perpendicular to the plane of said membrane-depressing face.

3. The pressure sensing head of claim 1 wherein said membrane-depressing face is provided with an annular depression concentric with said flow throttling opening and separated therefrom by an annular ridge, the surface of said ridge being recessed from the surface of said membrane-depressing face, and said membrane-depressor element is provided with at least one gas escape port connecting said annular depression to the atmosphere at a point removed from said membrane-depressing face.

4. The pressure sensing head of claim 1 wherein:
   a. said membrane-depressor element further comprises a substantially cylindrical support tube supporting said membrane-depressing face and
   b. said supporting structure comprises a projection coacting with the sides of said cylindrical support tube in a substantially friction free arrangement to restrict its motion to motion in a direction perpendicular to the plane of said membrane-depressing face.

5. The pressure sensing head of claim 4 wherein:
   a. said membrane-depressor element further comprises a disc supported by said support tube and containing said membrane-depressing face, said membrane-depressing face being provided with an annular depression concentric with said flow throttling opening and separated therefrom by an annular ridge, the surface of said annular ridge being recessed from the surface of said membrane-depressing face, said disc being further provided with at least one gas-escape port connecting said annular depression to the atmosphere at the rear of said disc; and
   b. said supporting structure comprises a first body part containing said cavity and a second body part, in the form of the frustum of a hollow cone, said second body part being supported by said first body part and the narrowest portion of said second body part coacting with said support tube in a substantially friction free arrangement to restrict its motion to motion in a direction perpendicular to the plane of said membrane-depressing face.

6. The pressure sensing head of claim 5 wherein said support tube comprises a rigid part and a flexible part connecting said disc to said rigid part, and wherein the second body part of said supporting structure comprises a projection coacting with the rigid part of said support tube to substantially restrict motion of said membrane-depressor element to motion in a direction perpendicular to the plane of said membrane-depressing face.

7. The pressure sensing head of claim 1 wherein said supporting structure comprises an annular flange extending from said supporting structure, and a flexible diaphragm supported in a substantially leaktight arrangement at its periphery by said annular flange to form said feedback chamber between said diaphragm and said supporting structure, said membrane-depressor element being supported by said diaphragm in a substantially leaktight arrangement, and said diaphragm being provided with an opening connecting said cavity to the passage in said membrane-depressor element, whereby movement of said membrane-depressor element varies the volume of said feedback chamber by deformation of said diaphragm.

8. The pressure sensing head of claim 7 wherein said membrane-depressor element comprises a flexible, substantially cylindrical support tube supporting said membrane-depressing face.

9. The pressure sensing head of claim 8 wherein said membrane-depressor element further comprises a rigid sleeve surrounding said flexible support tube over a portion of its length and wherein said supporting structure comprises a projection coacting with said rigid sleeve to substantially restrict the motion of said membrane-depressor element to motion in a direction perpendicular to the plane of said membrane-depressing face.

10. The pressure sensing head of claim 7 wherein said supporting structure comprises a projection coacting with the sides of said membrane-depressor element to restrict its motion to motion in a direction substantially perpendicular to the plane of said membrane-depressing face.

11. The pressure sensing head of claim 7 wherein said diaphragm has an annular deformation circumscribing the opening in its center, extending away from said feedback chamber, said deformation having an external diameter less than the diameter of said feedback chamber and an internal diameter greater than the external diameter of said membrane-depressor element.

12. The pressure sensing head of claim 7 wherein:
   a. said membrane-depressor element comprises a disc containing said membrane-depressing face and a substantially cylindrical support tube supporting said disc, said membrane-depressing face being provided with an annular depression concentric with said flow throttling opening and separated therefrom by an annular ridge, the surface of said ridge being recessed from the surface of said membrane-depressing face, and said disc having at least one gas-escape port connecting said annular depression to the atmosphere at the rear of said disc; and
   b. said supporting structure further comprises a restraining means in the form of the frustum of a hollow cone, the narrowest portion of the frustum coacting with said membrane-depressor element in a substantially friction free arrangement to restrict its motion to motion in a direction perpendicular to the plane of said membrane-depressing face.

* * * * *